(12) United States Patent
Nakano et al.

(10) Patent No.: US 8,413,524 B2
(45) Date of Patent: Apr. 9, 2013

(54) ACOUSTIC MATCHING MEMBER, ULTRASONIC TRANSMITTER/RECEIVER, AND ULTRASONIC FLOWMETER

(75) Inventors: Makoto Nakano, Shiga (JP); Takehiko Shigeoka, Nara (JP); Masahiko Ito, Nara (JP)

(73) Assignee: Panasonic Corporation (JP)

( * ) Notice: Subject to any disclaimer, the term of this patent is extended or adjusted under 35 U.S.C. 154(b) by 0 days.

(21) Appl. No.: 12/921,347

(22) PCT Filed: Jan. 9, 2009

(86) PCT No.: PCT/JP2009/000080
§ 371 (c)(1),
(2), (4) Date: Sep. 7, 2010

(87) PCT Pub. No.: WO2009/110163
PCT Pub. Date: Sep. 11, 2009

(65) Prior Publication Data
US 2011/0041621 A1  Feb. 24, 2011

(30) Foreign Application Priority Data
Mar. 7, 2008 (JP) .................................. 2008-058759

(51) Int. Cl.
*G01F 1/66* (2006.01)
(52) U.S. Cl. ............ 73/861.28; 310/326; 367/152
(58) Field of Classification Search .................. None
See application file for complete search history.

(56) References Cited

U.S. PATENT DOCUMENTS

| | | | |
|---|---|---|---|
| 2003/0231549 A1* | 12/2003 | Shiraishi et al. | 367/152 |
| 2004/0113522 A1* | 6/2004 | Nagahara et al. | 310/326 |
| 2004/0144181 A1* | 7/2004 | Shiraishi et al. | 73/801 |
| 2005/0236932 A1* | 10/2005 | Nagahara et al. | 310/328 |
| 2007/0007862 A1 | 1/2007 | Adachi et al. | |
| 2008/0219482 A1* | 9/2008 | Sato | 381/174 |

FOREIGN PATENT DOCUMENTS

| | | |
|---|---|---|
| CN | 1458808 A | 11/2003 |
| CN | 1839660 A | 9/2006 |
| EP | 1662840 A1 | 5/2006 |
| JP | 2002-135895 A | 5/2002 |
| JP | 2004-045389 A | 2/2004 |
| JP | 2004-184423 A | 7/2004 |
| JP | 2006-157771 A | 6/2006 |
| JP | 4702349 B | 6/2011 |
| WO | WO 03/064979 A1 | 8/2003 |
| WO | WO 2005/029912 A1 | 3/2005 |

OTHER PUBLICATIONS

International Search Report for International Application No. PCT/JP2009/000080, dated Apr. 21, 2009, 3 pages.
Office Action from counterpart Chinese Application No. 200980108051.3, dated Mar. 1, 2012, 11 pages (with English translation).

* cited by examiner

*Primary Examiner* — Harshad R Patel
(74) *Attorney, Agent, or Firm* — Brinks Hofer Gilson & Lione

(57) ABSTRACT

An acoustic matching member is fitted to a main body in a pair of ultrasonic transmitter/receivers. The acoustic matching member includes a matching member equipped with a porous body adhered tightly to an acoustic-wave emission surface of the main body. A dense layer is stacked on a surface of the porous body and includes a thermosetting resin and first flowability-diminishing particles. A sidewall member is adhered tightly to the acoustic-wave emission surface and an end face of the porous body.

8 Claims, 4 Drawing Sheets

ACOUSTIC MATCHING MEMBER, ULTRASONIC TRANSMITTER/RECEIVER, AND ULTRASONIC FLOWMETER

TECHNICAL FIELD

The present invention relates to an acoustic matching member for emitting an ultrasonic wave into a fluid, an ultrasonic transmitter/receiver to which the acoustic matching member is provided, and an ultrasonic flowmeter to which the ultrasonic transmitter/receiver is provided.

BACKGROUND ART

Recently the ultrasonic flowmeter for measuring a flow rate by counting a time necessary for an ultrasonic wave to pass through a propagation path and measuring a moving velocity of a fluid is utilized as a gas meter, and the like.

In the ultrasonic flowmeter, a pair of ultrasonic transmitter/receivers are provided to a pipe wall, along which a fluid (e.g., a gas) passes through, to intersect orthogonally with a flow of the fluid.

In case a flow rate of the fluid is measured by this ultrasonic flowmeter, first one ultrasonic transmitter/receiver emits an ultrasonic wave into a fluid, and then the ultrasonic transmitter/receiver receives the propagated ultrasonic wave and converts this ultrasonic wave into a voltage.

Then, the ultrasonic transmitter/receiver emits an ultrasonic wave into the fluid flowing through the inside of the pipe, and then one ultrasonic transmitter/receiver receives the propagated ultrasonic wave and converts this ultrasonic wave into a voltage.

Then, a flow rate of the fluid is detected based on the converted voltage, a velocity of the ultrasonic wave, an angle of an ultrasonic pulse in the propagation direction to the flowing direction of the fluid, a distance of a propagation path of the ultrasonic wave, etc.

Here, in a pair of ultrasonic transmitter/receivers, a matching member for transmitting the ultrasonic wave to the fluid in the passage is provided to an acoustic-wave emitting surface of a main body (transmitting/receiving surface of the ultrasonic wave) as an acoustic matching member respectively.

In the main body, a piezoelectric element is housed in a cylindrical case with bottom, an opening of the case is closed by a terminal plate, and terminals connected to the piezoelectric element via an electrically conductive rubber are supported by this terminal plate to protrude outwardly.

Also, the matching member has a matching layer made of a porous material (glass balloon (hollow)) to emit the ultrasonic wave into the fluid in the passage.

This matching member includes a first layer and a second layer whose acoustic impedances are different respectively, and is constructed such that the first layer is a composite material that is composed of a porous body and a filling material being bore in a porous hollow clearance, the second layer is formed of the filling material or the porous body, and no independent layer is present between the first layer and the second layer (see Patent Literature 1, for example).
Patent Literature 1: JP-A-2004-45389 Official Gazette

Problems that the Invention is to Solve

In Patent Literature 1, the matching layer contains at least two layers of the first layer and the second layer whose acoustic impedances are different respectively, and is constructed such that the independent layer is not present between the first layer and the second layer.

Therefore, a separation between the first layer and the second layer can be suppressed. As a result, a flow rate measuring accuracy of the fluid can be enhanced much more.

However, the practical implementation of the technology that makes it possible to measure a flow rate of the fluid with greater accuracy is demanded nowadays.

SUMMARY OF THE INVENTION

The present invention has been made to satisfy the foregoing demand, and it is an object of the present invention to provide an acoustic matching member, an ultrasonic transmitter/receiver, and an ultrasonic flowmeter capable of measuring a flow rate of a fluid with greater accuracy.

Means for Solving the Problems

An acoustic matching member of the present invention fitted to a main body in an ultrasonic transmitter/receiver, includes a matching member equipped with a porous body to be adhered tightly to an acoustic-wave emission surface of the main body, and a dense layer stacked on a surface of the porous body and including a thermosetting resin and first flowability-diminishing particles; and a sidewall member adhered tightly to the acoustic-wave emission surface and an end face of the porous body.

The sidewall member is adhered tightly to the acoustic-wave emission surface and the end face of the porous body. Accordingly, even when the ceramic porous body whose brittleness is high is employed as the matching member, the time-dependent degradation of the ceramic porous body can be suppressed, and the measuring accuracy can be improved.

Also, in the present invention, the porous body is sealed with the dense layer and the sidewall member.

Because the porous body is sealed with the dense layer and the sidewall member, the moisture absorption through a boundary portion between the acoustic-wave emission surface and the ceramic porous body and a boundary portion between the ceramic porous body and the dense layer can be prevented.

Also, in the present invention, flowability-diminishing particles are mixed into the sidewall member.

Here, the "flowability-diminishing particle" signifies the substance that is used to increase a viscosity of the viscous substance serving as the sidewall member.

That is, unless the sidewall member has a viscosity in some degree, such sidewall member is swept away by the fluid when this sidewall member is coated on the end surface of the porous body. Therefore, the flowability-diminishing particles are mixed to suppress such event.

In this manner, because the flowability-diminishing particles are mixed into the sidewall member, a desired viscosity can be given to the viscous substance serving as the sidewall member by the flowability-diminishing particles. Therefore, the end surface of the sidewall member can be covered without fail.

In addition, in the present invention, the flowability-diminishing particles are inorganic fillers.

Accordingly, the particles themselves are formed of the inorganic material. Therefore, change in quality caused due to a temperature is small and the flowability-diminishing particles can come to hand at a low cost.

Also, in the present invention, an average particle diameter of the flowability-diminishing particles is set to 0.01 to 0.1 µm.

Accordingly, a viscosity of the sidewall member can be lowered effectively. Also, osmosis of the sidewall member into the porous body can be suppressed effectively until the sidewall member is cured after it is coated.

Also, in the present invention, the flowability-diminishing particles are mixed by 1 to 5 wt %.

Accordingly, in case the sidewall member is coated by using a dispenser nozzle, osmosis of the sidewall member into the porous body can be suppressed effectively.

In addition, in the present invention, the sidewall member is formed by causing the porous body to adhere tightly to the acoustic-wave emission surface in the main body, and then supplying a viscous substance serving as the sidewall member to the end face of the porous body while turning the main body and the porous body integrally on an axis.

Also, an ultrasonic transmitter/receiver of the present invention, includes a cylindrical case with bottom; a piezoelectric body housed in the case; a terminal connected to the piezoelectric body via an electrically conductive rubber; and a terminal board for closing an opening of the case and supporting the terminal in a state that the terminal protrudes to an outer side; wherein the acoustic matching member set forth in any one of claim 1 to claim 7 is fitted to the acoustic-wave emission surface of the case, and also the acoustic matching member and the case are covered with a water repellant film.

Also, an ultrasonic flowmeter of the present invention, includes a flow-rate measuring portion through which a measured fluid flows; a pair of ultrasonic transmitter/receivers arranged on an upstream side and a downstream side of the flow-rate measuring portion to oppose to each other; an ultrasonic-wave propagation time measuring circuit for measuring a propagation time of an ultrasonic wave between the pair of ultrasonic transmitter/receivers; and a calculating unit for calculating a flow rate of the measured fluid per unit time, based on an ultrasonic-wave propagation time measured by the ultrasonic-wave propagation time measuring circuit; wherein the ultrasonic transmitter/receiver set forth in claim 8 is provided.

Advantage of the Invention

According to the acoustic matching member, the ultrasonic transmitter/receiver, and the ultrasonic flowmeter of the present invention, the sidewall member is adhered tightly to acoustic-wave transmitting/receiving surface and the end face of the porous body. Therefore, such advantages can be achieved that moisture absorption of the ceramic porous body caused due to the high temperature and humidity environment, a change of temperature, or the like can be suppressed, and also the measuring accuracy can be improved.

DESCRIPTION OF REFERENCE NUMERALS AND SIGNS

| | |
|---|---|
| 10 | ultrasonic flowmeter |
| 11 | flow-rate measuring portion |
| 12 | passage |
| 15, 16 | first and second ultrasonic transmitter/receivers (a pair of ultrasonic transmitter/receivers) |
| 17 | ultrasonic-wave propagation time measuring circuit |
| 18 | calculating unit |
| 21 | main body |
| 24 | acoustic matching member |
| 25 | case |
| 25A | opening of the case |
| 26 | water-repellant film |
| 27 | acoustic-wave emission surface |
| 28 | piezoelectric body |
| 29 | terminal |
| 31 | terminal board |
| 34 | matching member |
| 35 | porous body |
| 35A | end face of the porous body |
| 35B | surface |
| 36 | sidewall member |
| 37 | dense layer |
| 38 | thermosetting resin |
| 39 | first flowability-diminishing particle (flowability-diminishing particle) |
| 43 | second flowability-diminishing particle (flowability-diminishing particle) |

DETAILED DESCRIPTION OF THE PREFERRED EMBODIMENTS

An acoustic matching member, an ultrasonic transmitter/receiver, and an ultrasonic flowmeter according to an embodiment of the present invention will be explained with reference to the drawings hereinafter.

Figure 1:
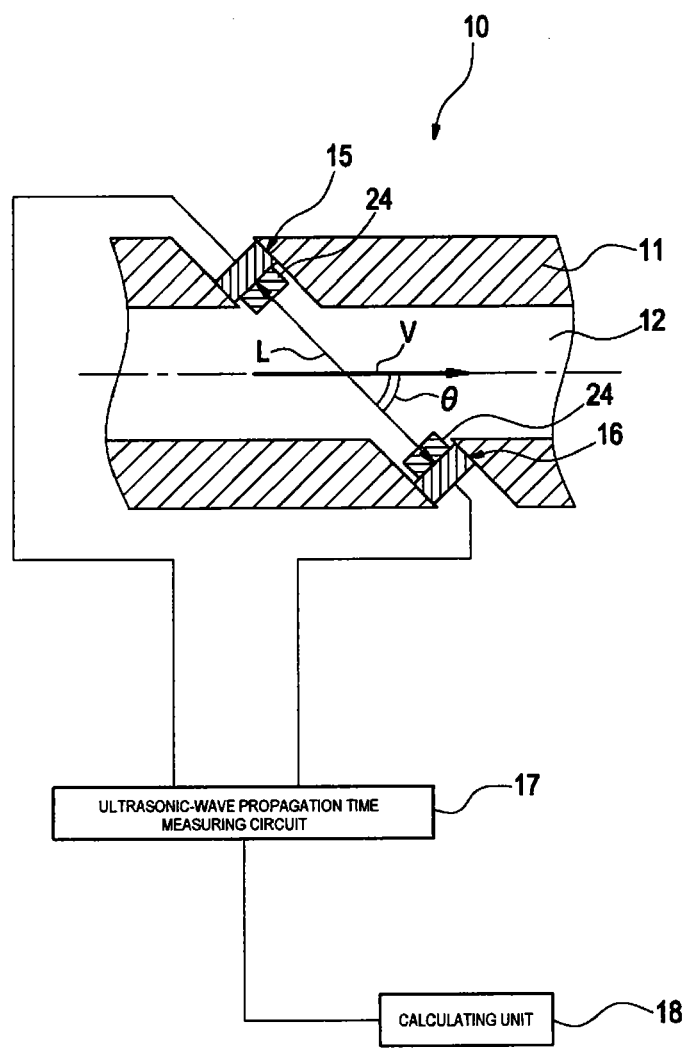
FIG. 1 is a sectional view showing an ultrasonic flowmeter according to the present invention.

As shown in FIG. 1, an ultrasonic flowmeter 10 according to the present embodiment includes a flow-rate measuring portion 11 equipped with a passage 12 through which a fluid (measured fluid (as an example, a gas)), first and second ultrasonic transmitter/receivers (a pair of ultrasonic transmitter/receivers) 15, 16 arranged on the upstream side and the downstream side of the flow-rate measuring portion 11 to oppose to each other, an ultrasonic-wave propagation time measuring circuit 17 provided between the first and second ultrasonic transmitter/receivers 15, 16, and a calculating unit 18 for calculating a flow rate of the fluid per unit time based on an ultrasonic-wave propagation time measured by the ultrasonic-wave propagation time measuring circuit 17.

In measuring a flow velocity V of the fluid flowing through the passage 12 by the ultrasonic flowmeter 10, first an AC voltage whose frequency is set close to a resonance frequency of the first ultrasonic transmitter/receiver 15 is applied to a piezoelectric transducer, and thus an ultrasonic wave is emitted into the fluid from the first ultrasonic transmitter/receiver 15. The emitted ultrasonic wave is received by the second ultrasonic transmitter/receiver 16 and is converted into a voltage.

Then, an AC voltage whose frequency is set close to a resonance frequency of the second ultrasonic transmitter/receiver 16 is applied to a piezoelectric transducer, and thus an ultrasonic wave is emitted into the fluid from the second ultrasonic transmitter/receiver 16. The emitted ultrasonic wave is received by the first ultrasonic transmitter/receiver 15 and is converted into a voltage.

Here, it is assumed that a flow velocity of the fluid flowing through the passage 12 is V, an acoustic velocity of the ultrasonic wave in the fluid is C, and an angle of the propagation direction of an ultrasonic pulse to the flowing direction of the fluid is θ.

When a single-around period as a time that the ultrasonic pulse being emitted from the first ultrasonic transmitter/receiver 15 requires to arrive at the second ultrasonic transmitter/receiver 16 is set to t1 and a single-around frequency is set to f1, Equation (1) is given as follows.

$$f1=1/t1=(C+V\cos\theta)/L \tag{1}$$

Also, when a single-around period as a time that the ultrasonic pulse being emitted from the second ultrasonic transmitter/receiver 16 requires to arrive at the first ultrasonic transmitter/receiver 15 is set to t2 and a single-around frequency is set to f2, Equation (2) is given as follows.

$$f2=1/t2=(C-V\cos\theta)/L \tag{2}$$

Accordingly, a frequency difference Δf between both single-around frequencies is given by Equation (3). Then, the flow velocity V of the fluid can be derived from a distance L of the propagation path of the ultrasonic wave and the frequency difference Δf, and a flow rate can be derived from the flow velocity V.

$$\Delta f=f1-f2=2(V\cos\theta)/L \tag{3}$$

In order to improve an accuracy of the ultrasonic flowmeter 10, an acoustic impedance of an acoustic matching member 24 provided to an acoustic-wave transmitting/receiving surface (referred to as an "acoustic-wave emission surface" hereinafter) 27 in the first and second ultrasonic transmitter/receivers 15, 16 (i.e., a piezoelectric body 28 shown in FIG. 2) that transmits/receives the ultrasonic wave is important.

Here, the first and second ultrasonic transmitter/receivers 15, 16 are constructed to have the same structure respectively. Therefore, the structure of the first ultrasonic transmitter/receiver 15 is explained hereinafter, but explanation of the second ultrasonic transmitter/receiver 16 will be omitted hereinafter.

Figure 2:
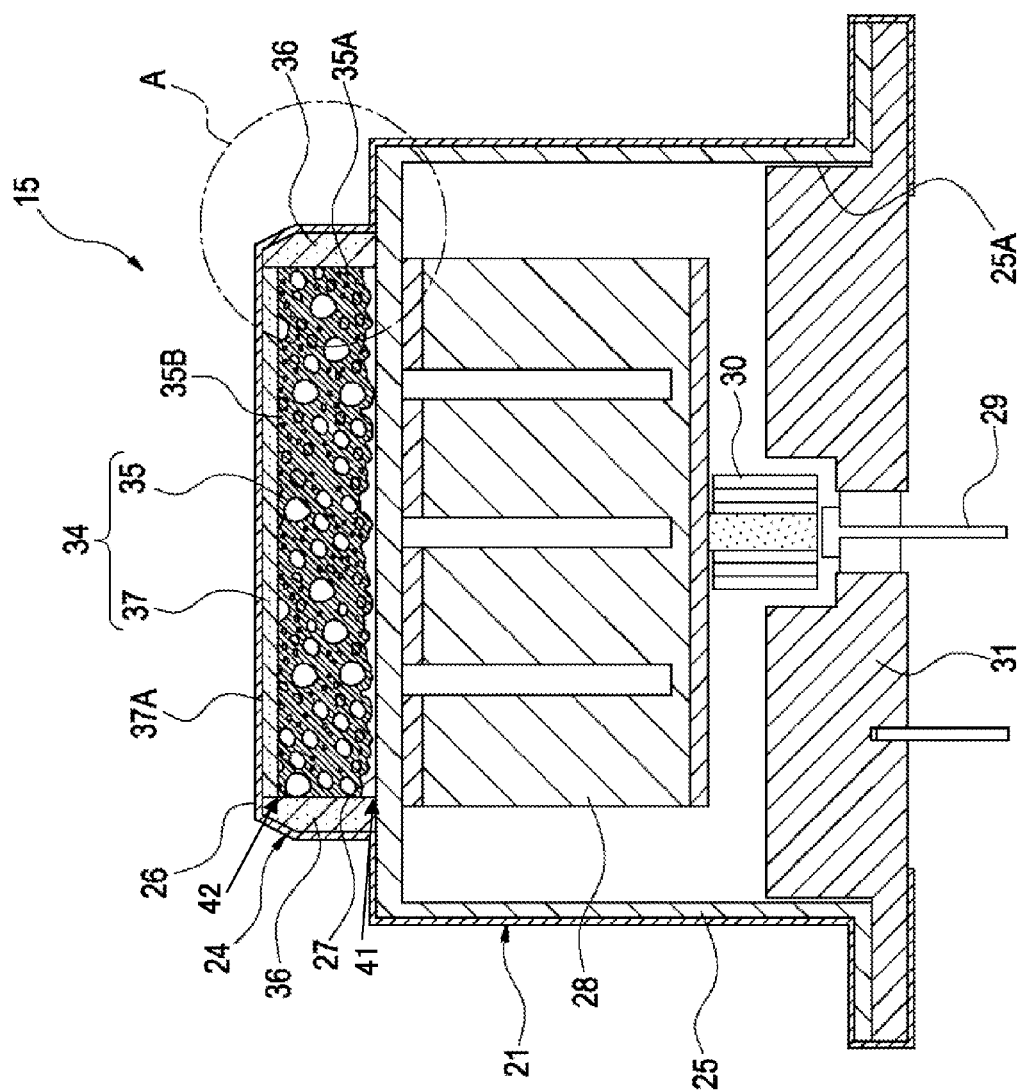
FIG. 2 is a sectional view showing the ultrasonic flowmeter according to the present invention.
Figure 3:
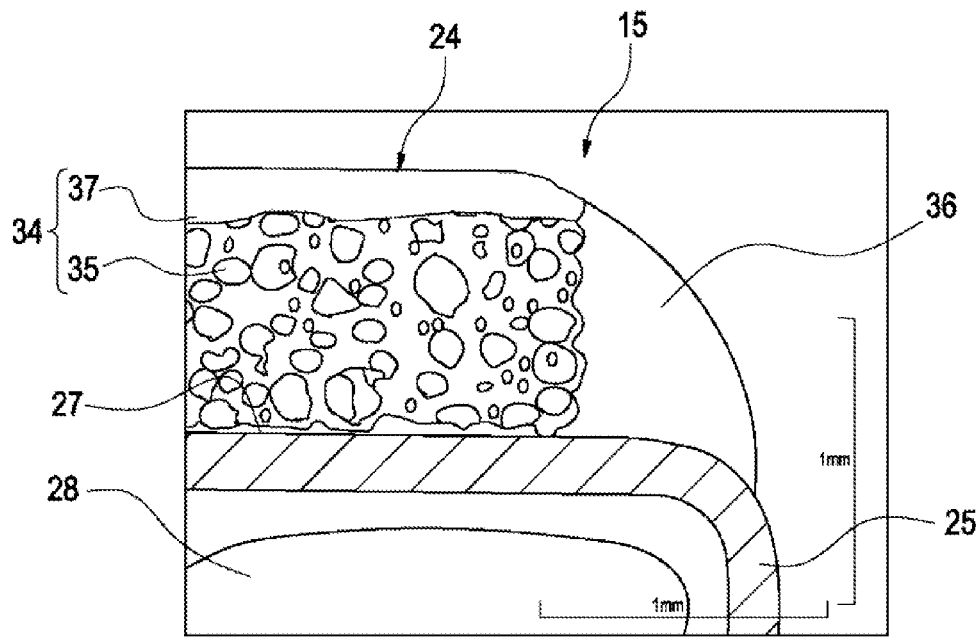
FIG. 3 is an enlarged photograph of an A portion of FIG. 2.

As shown in FIG. 2 and FIG. 3, the first ultrasonic transmitter/receiver 15 has a main body 21 for producing the ultrasonic wave, the acoustic matching member 24 provided to the acoustic-wave emission surface 27 of the main body 21 to transfer the ultrasonic wave produced by the main body 21 to the fluid, and a water repellant film 26 for covering the acoustic matching member 24 and a case 25 of the main body 21.

The main body 21 has the cylindrical case 25 with bottom, the piezoelectric body 28 housed in the case 25, a terminal 29 connected to the piezoelectric body 28 via an electrically conductive rubber, and a terminal board 31 for closing an opening 25A of the case 25 and supporting the terminal 29 in a state that this terminal is protruded outwardly.

The acoustic matching member 24 is fitted to the acoustic-wave emission surface 27 of the case 25.

This acoustic matching member 24 has a matching member 34 adhered tightly to the acoustic-wave emission surface 27, and a sidewall member 36 adhered tightly to the acoustic-wave emission surface 27 and an end face 35A of a porous body 35.

According to the first ultrasonic transmitter/receiver 15, the ultrasonic wave vibrated by the piezoelectric body 28 oscillates at a particular frequency, and then the oscillation is transmitted to the matching member 34 via the case 25. The oscillation transmitted to the matching member 34 propagates through the fluid as the acoustic wave.

In this case, a role of the matching member 34 is to cause the oscillation of the piezoelectric body 28 to propagate effectively through the fluid. An acoustic impedance is defined by an acoustic velocity C in the fluid and a density ρ, as given by Equation (4) as follows.

$$Z=\rho \times C \tag{4}$$

An acoustic impedance is largely different between the piezoelectric body and the fluid.

In this manner, a reflection is caused during the propagation of the acoustic wave on the boundary surface at which the acoustic impedances are different, and thus an intensity of the transmitted acoustic wave is weakened.

Therefore, the method of reducing a reflection of the acoustic wave and enhancing a transmitted intensity of the acoustic wave by inserting the substance, an acoustic impedance of which has a relationship given by Equation (5) as follows, between the piezoelectric body 28 with an acoustic impedance Z1 and the fluid with an acoustic impedance Z2 is known.

$$Z=(Z1 \times Z2)^{(1/2)} \tag{5}$$

As appreciated from Equation (4), the solid whose density is small and whose acoustic velocity is slow is required of the substance that satisfies this acoustic impedance.

Therefore, such a conditions should be satisfied by providing the porous body 35 to the matching member 34 that the solid whose density is small and whose acoustic velocity is slow should be provided.

Then, in order to provide the porous body 35 to the matching member 34, the matching member 34 is constructed as follows.

Figure 4:
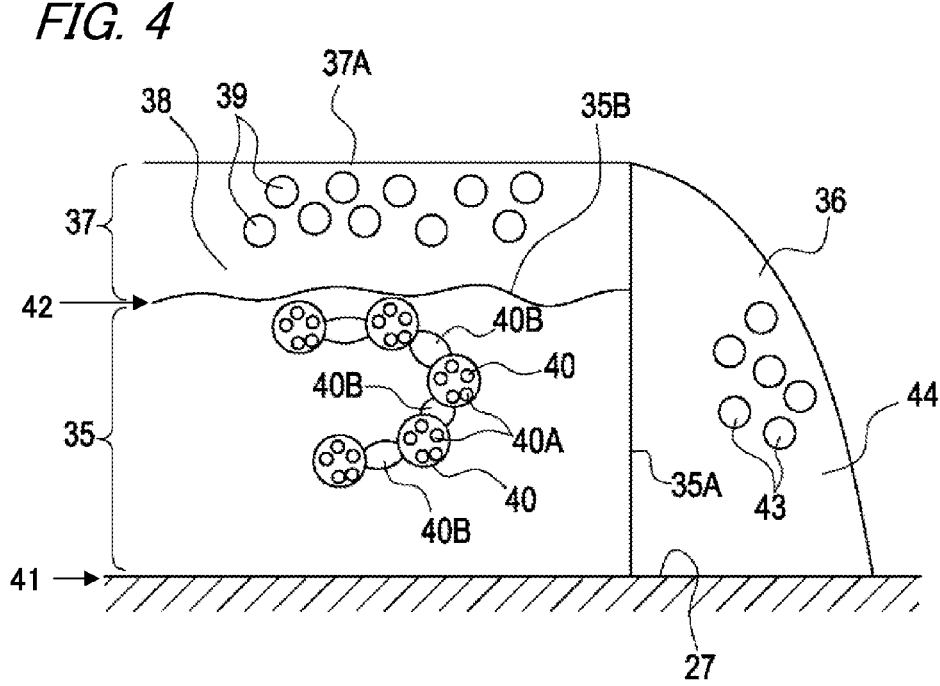
FIG. 4 is an enlarged view showing a state in which a water-repellant film is removed from the A portion of FIG. 2.

That is, the matching member 34 is equipped with the porous body 35 that is adhered tightly to the acoustic-wave emission surface 27, and a dense layer 37 that is stacked on a surface 35B of the porous body 35 and includes a thermosetting resin 38 and first flowability-diminishing particles (flowability-diminishing particles) 39 shown in FIG. 4.

The porous body 35 is sealed with the dense layer 37 and the sidewall member 36.

By way of example, as shown in FIG. 4, a porous body which is made of ceramic and whose skeleton 40 contains clearances 40A (referred to as a "ceramic porous body 35" hereinafter) is employed as the porous body 35.

Also, in the ceramic porous body 35, a hole 40B is formed between the skeleton 40 and the skeleton 40.

As shown in FIG. 2, the ceramic porous body 35 is sealed with the dense layer 37 and the sidewall member 36. Therefore, the moisture absorption through a boundary portion 41 between the acoustic-wave emission surface 27 and the ceramic porous body 35 and a boundary portion 42 between the ceramic porous body 35 and the dense layer 37 can be prevented.

As shown in FIG. 4, the dense layer 37 includes the thermosetting resin 38 and the first flowability-diminishing particles 39, and a surface 37A of the dense layer 37 is formed flat.

Because the surface 37A of the dense layer 37 is formed flat, a straightness of the acoustic wave can be ensured and a measuring accuracy can be enhanced.

This dense layer 37 is formed by the transfer method.

As the transfer method, by way of an example, the dense layer 37 is formed by the method of printing an epoxy resin on other material (a PET film onto a mod release agent is applied) by means of the screen printing, the metal mask printing, or the like, then arranging the ceramic porous body 35 thereon, and then transferring the resin onto the surface 35B of the ceramic porous body 35.

In the thermosetting resin 38 of the dense layer 37 shown in FIG. 4, by way of an example, an epoxy-based resin is employed as the binder.

Also, the first flowability-diminishing particles 39 of the dense layer 37 are added to increase a viscosity of the dense layer 37. A solid content rate (concentration of a volume solid content) is set to 30 to 50%.

Also, an average particle diameter of the first flowability-diminishing particles 39 is 0.05 μm to 5 μm.

The reason why a solid content rate (concentration of a volume solid content) of the first flowability-diminishing particles 39 is set to 30 to 50% and an average particle diameter is decided as 0.05 μm to 5 μm will be explained hereunder.

First, the reason why a solid content rate (concentration of a volume solid content) of the first flowability-diminishing particles 39 is decides as 30 to 50% will be explained with reference to a graph of FIG. 5 and Table 1 hereunder.

Figure 5:
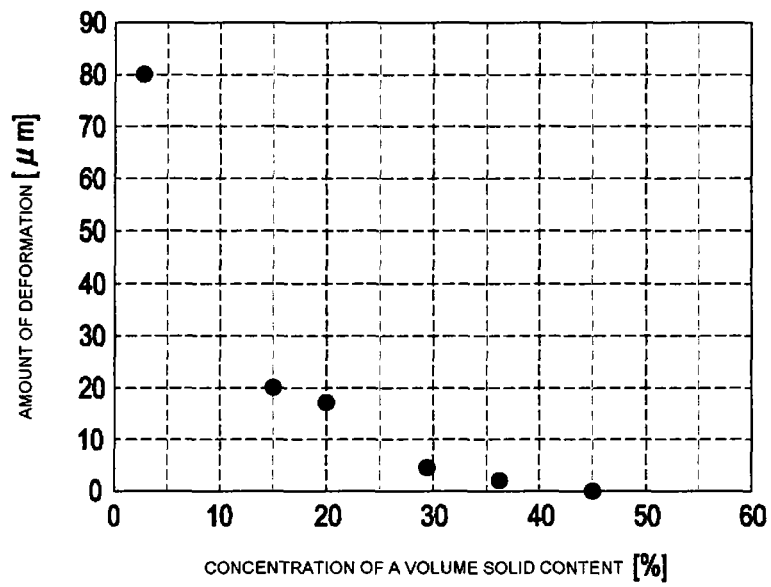
FIG. 5 is a graph showing a relationship between a solid content rate of first flowability-diminishing particles that are mixed into a dense layer (concentration of a volume solid content) and an amount of deformation of a surface of the dense layer according to the present invention.

In this case, the data shown in the graph of FIG. 5 and Table 1 correspond to the data that are obtained after 240 hours have elapsed in the environment of the high temperature and humidity test condition: 70° C.

A solid content rate of the first flowability-diminishing particles 39 is derived by following Equation (1).

Solid content rate=$[Vp/(Vb+Vp)] \times 100$ where Vb: volume of the binder (epoxy-based resin) 38, and
Vp: volume of the first flowability-diminishing particles 39.

TABLE 1

|  | Composition | Concentration of Volume Solid Content | Amount of Deformation |
|---|---|---|---|
| Comparative Example 1 | DT-83-33 | 2.8 | 80 |
| Comparative Example 2 |  | 15.0 | 20 |
| Comparative Example 3 |  | 20.0 | 17 |
| Example 1 | SiC 45/55 | 29.5 | 4.5 |
| Example 2 | SiC 55/45 | 36.2 | 2 |
| Example 3 | SiC 65/35 | 45.0 | 0 |

As shown in the graph of FIG. 5 and Table 1, in Comparative Example 1, a solid content rate of the first flowability-diminishing particles 39 is 2.8%, and an amount of deformation of the surface 37A of the dense layer 37 is large like 80.

In Comparative Example 2, a solid content rate of the first flowability-diminishing particles 39 is 15.0%, and an amount of deformation of the surface 37A of the dense layer 37 is large like 20.

In Comparative Example 3, a solid content rate of the first flowability-diminishing particles 39 is 20.0%, and an amount of deformation of the surface 37A of the dense layer 37 is large like 17.

In Example 1, a solid content rate of the first flowability-diminishing particles 39 is 29.5%, and an amount of deformation of the surface 37A of the dense layer 37 can be suppressed small like 4.5.

In Example 2, a solid content rate of the first flowability-diminishing particles 39 is 36.2%, and an amount of deformation of the surface 37A of the dense layer 37 can be suppressed small like 2.

In Example 3, a solid content rate of the first flowability-diminishing particles 39 is 45.0%, and an amount of deformation of the surface 37A of the dense layer 37 can be suppressed small like 0.

From the graph of FIG. 5 and Table 1, it is understood that, when a solid content rate of the first flowability-diminishing particles 39 is more than 29.5%, an amount of deformation of the surface 37A of the dense layer 37 can be suppressed smaller than 4.5.

Also, when a solid content rate of the first flowability-diminishing particles 39 is more than 45.0%, an amount of deformation of the surface 37A of the dense layer 37 can be suppressed to 0.

Here, when a solid content rate of the first flowability-diminishing particles 39 is in excess of 50.0%, it is difficult to keep appropriately a viscosity of the dense layer 37 because a volume (Vb) of the binder (epoxy-based resin) 38 in the dense layer 37 is excessively reduced.

Therefore, a solid content rate (concentration of a volume solid content) of the first flowability-diminishing particles 39 is decided as 30% to 50%.

Next, the reason why an average particle diameter of the first flowability-diminishing particles 39 is decided to 0.05 μm to 5 μm will be explained with reference to a graph in FIG. 6 and Table 2 hereunder.

TABLE 2

|  | Particle Diameter [μm] | Amount of Deformation |
|---|---|---|
| Example 4 | 0.3 | 8 |
| Example 5 | 0.5 | 5 |
| Example 6 | 1.0 | 2 |
| Example 7 | 2.0 | 2.5 |
| Example 8 | 5.0 | 3 |

Figure 6:
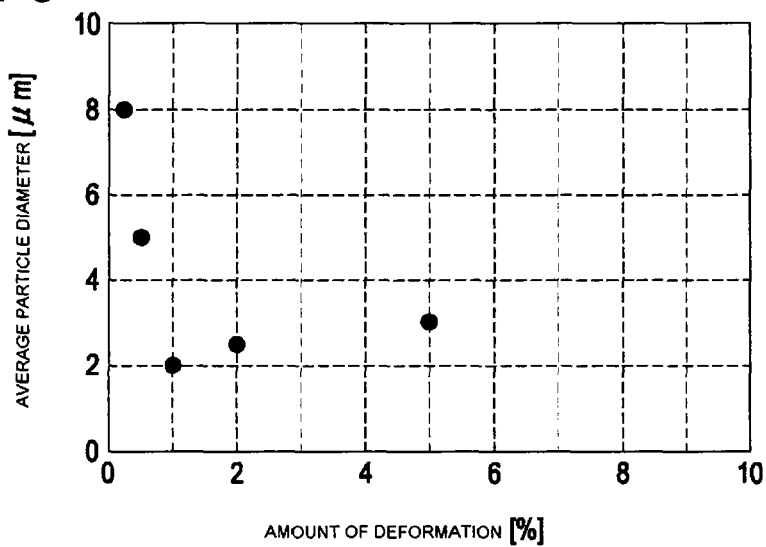
FIG. 6 is a graph showing a relationship between an average particle diameter of first flowability-diminishing particles that are mixed into a dense layer and an amount of deformation of a surface of the dense layer according to the present invention.

As shown in the graph of FIG. 6 and Table 2, in Example 4, an average particle diameter of the first flowability-diminishing particles 39 is 0.3 μm, and a viscosity can be secured. Therefore, an amount of deformation of the surface 37A of the dense layer 37 can be suppressed small like 8.

In Example 5, an average particle diameter of the first flowability-diminishing particles 39 is 0.5 μm, and a viscosity can be secured. Therefore, an amount of deformation of the surface 37A of the dense layer 37 can be suppressed small like 5.

In Example 6, an average particle diameter of the first flowability-diminishing particles 39 is 1.0 μm, and a viscosity can be secured. Therefore, an amount of deformation of the surface 37A of the dense layer 37 can be suppressed small like 2.

In Example 7, an average particle diameter of the first flowability-diminishing particles 39 is 2.0 μm, and a viscosity can be secured. Therefore, an amount of deformation of the surface 37A of the dense layer 37 can be suppressed small like 2.5.

In Example 8, an average particle diameter of the first flowability-diminishing particles 39 is 5.0 μm, and a viscosity can be secured. Therefore, an amount of deformation of the surface 37A of the dense layer 37 can be suppressed small like 3.

From the graph of FIG. 6 and Table 2, it is understood that, when an average particle diameter of the first flowability-diminishing particles 39 is 0.05 μm to 5 μm, an amount of deformation of the surface 37A of the dense layer 37 can be suppressed smaller than 8.

In this event, it may be considered that, when an average particle diameter of the first flowability-diminishing particles 39 is in excess of 5 μm, an average particle diameter is increased excessively and thus unevenness is generated on the surface 37A of the dense layer 37 due to unevenness of the first flowability-diminishing particles 39.

Therefore, an average particle diameter of the first flowability-diminishing particles 39 is decided as 0.05 μm to 5 μm.

As shown in FIG. 2, the sidewall member 36 is adhered tightly to the acoustic-wave emission surface 27 and the end face 35A of the ceramic porous body 35. Thus, the sidewall member 36 can support the ceramic porous body 35 that is relatively brittle.

Further, the sidewall member 36 has hygroscopic properties.

In the sidewall member 36, as shown in FIG. 4, second flowability-diminishing particles 43 are mixed into a photocurable resin 44 by 1 to 5 wt %.

The second flowability-diminishing particles 43 are the substance that is used to increase a viscosity of the fluid as the sidewall member 36. By way of example, an inorganic filler whose average particle diameter is 0.01 to 0.1 μm is employed. The inorganic filler is not particularly limited, and also silica, alumina, silicon carbide, or the like, for example, may be employed.

Because the second flowability-diminishing particles 43 are mixed into the sidewall member 36, a desired viscosity can be given to the sidewall member 36 by the second flowability-diminishing particles 43. Thus, the end face 35A of the ceramic porous body 35 can be covered with the sidewall member 36 without fail.

Also, the sidewall member 36 has the hygroscopic properties, as described above. Because the sidewall member 36 has the hygroscopic properties, such an event can be prevented that the ceramic porous body 35 absorbs moisture.

As a result, such a situation can be suppressed that the acoustic velocity is accelerated due to the moisture absorption of the ceramic porous body 35. That is, measuring accuracy can be improved by suppressing the acoustic velocity adequately slowly.

This sidewall member 36 is formed in such a way that the ceramic porous body 35 is caused to adhere tightly to the acoustic-wave emission surface 27, then a viscous substance serving as the sidewall member 36 is supplied to the end face 35A of the ceramic porous body 35 while turning the main body 21 and the ceramic porous body 35 integrally on an axis, and then the viscous substance is cured by the ultraviolet rays.

In the water repellant film 26, by way of example, parylene material is coated on the acoustic matching member 24 and the case 25 by the vapor deposition. Because the acoustic matching member 24 and the case 25 are sealed with the water repellant film 26, a time dependent change of the acoustic matching member 24 and the case 25 can be suppressed.

In particular, the measuring accuracy can be stabilized because a time dependent change of the surface 37A of the dense layer 37 provided to the acoustic matching member 24 is suppressed.

As explained above, according to the ultrasonic flowmeter 10, the sidewall member 36 is provided to the acoustic matching member 24. Therefore, even though the ceramic porous body 35 whose brittleness is high is employed as the matching member 34, it is not possible that a time dependent change is caused. As a result, the measuring accuracy can be improved.

This application is based upon Japanese Patent Application (Patent Application No. 2008-058759) filed on Mar. 7, 2008; the contents of which are incorporated herein by reference.

INDUSTRIAL APPLICABILITY

The present invention is suitable for the application to the acoustic matching member for emitting an ultrasonic wave onto a fluid, the ultrasonic transmitter/receiver to which the acoustic matching member is provided, and the ultrasonic flowmeter to which the ultrasonic transmitter/receiver is provided.

The invention claimed is:

1. An acoustic matching member fitted to a main body in an ultrasonic transmitter/receiver, comprising:
    a matching member comprising a porous body to be adhered tightly to an acoustic-wave emission surface of the main body, and a dense layer stacked on a surface of the porous body and including a thermosetting resin and first flowability-diminishing particles; and
    a sidewall member adhered tightly to the acoustic-wave emission surface and an end face of the porous body;
    wherein the flowability-diminishing particles are mixed into the sidewall member.

2. An acoustic matching member according to claim 1, wherein the porous body is sealed with the dense layer and the sidewall member.

3. An acoustic matching member according to claim 1, wherein the flowability-diminishing particles are inorganic fillers.

4. An acoustic matching member according to claim 1, wherein an average particle diameter of the flowability-diminishing particles is set to 0.01 to 0.1 μm.

5. An acoustic matching member according to claim 1, wherein the flowability-diminishing particles are mixed by 1 to 5 wt %.

6. An acoustic matching member according to claim 1, wherein the sidewall member is formed by causing the porous body to adhere tightly to the acoustic-wave emission surface in the main body, and then supplying a viscous substance serving as the sidewall member to the end face of the porous body while turning the main body and the porous body integrally on an axis.

7. An ultrasonic transmitter/receiver, comprising:
    a cylindrical case with bottom;
    a piezoelectric body housed in the case;
    a terminal connected to the piezoelectric body via an electrically conductive rubber; and
    a terminal board for closing an opening of the case and supporting the terminal in a state that the terminal protrudes to an outer side;
    wherein the acoustic matching member set forth in claim 1 is fitted to the acoustic-wave emission surface of the case, and also the acoustic matching member and the case are covered with a water repellant film.

8. An ultrasonic flowmeter, comprising:
    a flow-rate measuring portion through which a measured fluid flows;
    a pair of ultrasonic transmitter/receivers arranged on an upstream side and a downstream side of the flow-rate measuring portion to oppose to each other;
    an ultrasonic-wave propagation time measuring circuit for measuring a propagation time of an ultrasonic wave between the pair of ultrasonic transmitter/receivers; and
    a calculating unit for calculating a flow rate of the measured fluid per unit time, based on an ultrasonic-wave propagation time measured by the ultrasonic-wave propagation time measuring circuit;
    wherein the ultrasonic transmitter/receiver set forth in claim 7 is provided.

* * * * *